United States Patent
Tirpak et al.

(10) Patent No.: US 8,688,665 B2
(45) Date of Patent: Apr. 1, 2014

(54) COLLABORATIVE TRANSCODING

(75) Inventors: Thomas M. Tirpak, Glenview, IL (US); Carlton J. Sparrell, Marblehead, MA (US)

(73) Assignee: Motorola Mobility LLC, Libertyville, IL (US)

( * ) Notice: Subject to any disclaimer, the term of this patent is extended or adjusted under 35 U.S.C. 154(b) by 835 days.

(21) Appl. No.: 12/245,235

(22) Filed: Oct. 3, 2008

(65) Prior Publication Data

US 2010/0088292 A1     Apr. 8, 2010

(51) Int. Cl.
*G06F 7/00*       (2006.01)
*G06F 15/16*      (2006.01)

(52) U.S. Cl.
USPC .......................................... 707/705; 709/224

(58) Field of Classification Search
CPC ..................... G06F 17/30206; G06F 17/30209
USPC ............ 707/705, 999.107; 725/132; 709/224, 709/246, 223, 204, 225, 226
See application file for complete search history.

(56) References Cited

U.S. PATENT DOCUMENTS

| | | | |
|---|---|---|---|
| 7,680,937 B2 * | 3/2010 | Miller et al. .................. | 709/226 |
| 2004/0049797 A1 * | 3/2004 | Salmonsen ..................... | 725/132 |
| 2004/0054689 A1 * | 3/2004 | Salmonsen et al. ......... | 707/104.1 |
| 2005/0097169 A1 * | 5/2005 | Mukherjee et al. ........... | 709/204 |
| 2005/0165742 A1 * | 7/2005 | Chin ................................. | 707/3 |
| 2005/0198290 A1 * | 9/2005 | Berkey et al. ................. | 709/225 |
| 2007/0005334 A1 * | 1/2007 | Salmonsen ..................... | 703/26 |
| 2007/0043883 A1 * | 2/2007 | MacDougall et al. .......... | 710/11 |
| 2007/0150596 A1 * | 6/2007 | Miller et al. ................... | 709/226 |
| 2007/0244983 A1 * | 10/2007 | Berger .......................... | 709/217 |
| 2008/0091813 A1 * | 4/2008 | Bodlaender ................... | 709/223 |
| 2008/0091845 A1 * | 4/2008 | Mills et al. ..................... | 709/246 |
| 2008/0207182 A1 * | 8/2008 | Maharajh et al. .......... | 455/414.1 |
| 2008/0215557 A1 * | 9/2008 | Ramer et al. ...................... | 707/4 |
| 2008/0270906 A1 * | 10/2008 | Reddy .......................... | 715/733 |
| 2008/0307094 A1 * | 12/2008 | Karonen et al. .............. | 709/226 |
| 2009/0157480 A1 * | 6/2009 | Smith .............................. | 705/10 |
| 2010/0166387 A1 * | 7/2010 | Miyake et al. .................. | 386/95 |

OTHER PUBLICATIONS

Digital Living Network Alliance, "DLNA Overview and Vision Whitepaper 2007" (2007), available at <http://www.dlna.org/news/DLNA_white_paper.pdf>.

* cited by examiner

*Primary Examiner* — Hung T Vy

(57) ABSTRACT

A method of collaborative transcoding includes discovering capabilities of devices within a network; exchanging information about content stored within the network; anticipating a request for a content item in a target format; identifying a location of the content item by referencing the information about content stored within the network; and, if the content item is not in the target format, selecting a the device within the network to transcode the content into the target format. A system for collaborative transcoding includes a network, the network comprising a first networked device and at least one other networked device, the first networked device receiving a request for a content item in a target format; a shared content history; the shared content history comprising a list of content available on the network, the first networked device searching the shared content history to determine if another networked device can provide the content item; a capability list comprising a native format and transcoding capabilities of the networked devices, the first networked device searching the capability list to determine if any the networked device is configured to transcode the content item from a source format to a target format.

20 Claims, 6 Drawing Sheets

310

| Device: | Mobile Device MD2 | |
|---|---|---|
| Native Format: | MPEG4 | |
| Transcoding Capabilities | | |
| Source Format | Target Format | Efficiency Score |
| MPEG2 | MPEG1 | 30 |
| MPEG2 | WMV9 | 85 |
| WMV9 | MPEG2 | 42 |
| MPEG1 | WMV9 | 50 |

300

| Device: | Home Gateway STB1 | |
|---|---|---|
| Native Format: | MPEG2 | |
| Transcoding Capabilities | | |
| Source Format | Target Format | Efficiency Score |
| MPEG2 | MPEG4 | 92 |
| MPEG2 | WMV9 | 65 |
| MPEG4 | MPEG2 | 25 |

140

110

| Collaborative Dialogue Levels | |
|---|---|
| Priority | Dialogue |
| Foreground | Request for content |
| Foreground | Request for transcoding |
| Background | Discovering transcoding capabilities |
| Background | Updating shared content history |

*Fig. 2*

COLLABORATIVE TRANSCODING

BACKGROUND

A home media network can be used to connect multiple electronic devices within the home. These devices may have varying capabilities and could be made by a variety of manufacturers. For example, devices interconnected within a home media network may include: mobile computing devices, personal computers, set top boxes, entertainment centers, home security systems, high definition television sets, and other electronic devices. Each of these interconnected devices may have one or more preferred media formats. Additionally, some of the devices may have the ability to transcode content from a source format into a preferred or target format.

Content stored or generated within the home media network typically exists in a variety of forms. In order to ensure seamless home media experiences, it is necessary to efficiently transform content to be compatible with a variety of target display devices within the home media network. Some of the challenges in performing timely transformations include: discovery and management of information about the capabilities of various devices within the home network; communication of the location and the availability of source content; and the availability and performance of devices for transforming the media into a target format.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 2 is an illustrative chart showing various collaborative dialogue levels within a peer-to-peer network, according to one embodiment of principles described herein.

Throughout the drawings, identical reference numbers designate similar, but not necessarily identical, elements.

DETAILED DESCRIPTION

Figure 1:
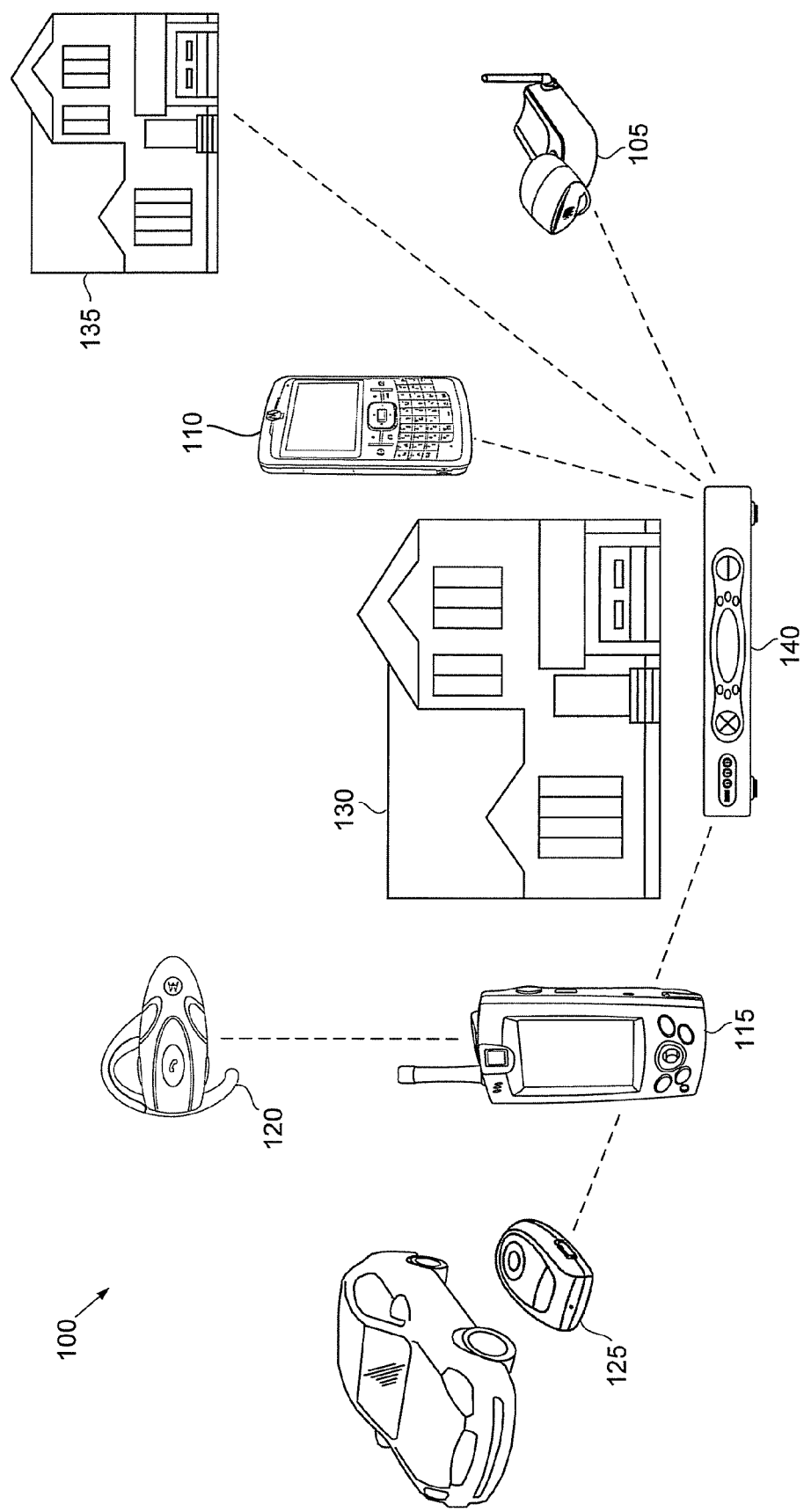
FIG. 1 is an illustrative diagram of a peer-to-peer home media network formed among devices belonging to a given user and accessible through local and group associations, according to one embodiment of principles described herein.

Consumers are acquiring, viewing, and managing an increasing amount of digital media on consumer electronics, personal computers, and mobile devices. The consumers want to enjoy this content easily and conveniently across different devices and locations within their home media network, regardless of the source. For example, consumers desire to easily acquire, store and access digital music from a variety of devices and locations. To provide a seamless user experience, the requested media content must be transformed so that is compatible the selected playback device and communicated to the selected playback device in a timely fashion.

Consequently, the present specification describes systems and methods in which user habits regarding media content playback are recorded. Additionally, the capabilities of devices on the network to transcode media files or content from one format to another are logged. Using this information, the system automatically seeks to load content to a playback device that the system anticipates will be accessed by the user to playback that content. In conjunction with this, the system also automatically has the media files for the content in question transcoded into the format used by the target playback device. This transcoding may occur anywhere on the network that it can be most efficiently performed.

Such a system may be illustratively embodied in a home media network. A home media network can be used to connect multiple electronic devices within the home. For example, devices interconnected within a home media network may include: mobile computing devices, personal computers, set top boxes, automobile hosted electronics, entertainment centers, home security systems, high definition television sets, and other electronic devices. Each of these interconnected devices may have one or more preferred media formats. Additionally, some of the devices may have the ability to transcode content from a source format into a preferred or target format.

Often connections within a home media network are made using multiple standards/protocols. For example, wired connections could be made using standards such as 802.3i and 802.3u, and wireless connections could be made using 802.11 a/b/g, 802.11n, or Bluetooth standards. Connections between home media networks may also include deployable home wired physical layers. By way of example and not limitation, these home wired physical layers may be based on standards promulgated by organizations such as the Home Phoneline Networking Alliance (HPNA), Home Powerline Alliance (creators of HomePlug), and Multimedia Over Coax Alliance (MOCA).

Additionally, content stored or generated within the home media network typically exists in a variety of formats. By way of example and not limitation these formats may include MP3 (Moving Picture Experts Group-audio layer 3), WMA9 (Windows Media Audio version 9), JPEG (Joint Photographic Experts Group), LPCM (Linear Pulse Code Modulation), MPEG2 (Moving Picture Experts Group 2), WMV9 (Windows Media Video version 9) and MPEG4 (Moving Picture Experts Group 4).

In order to ensure seamless home media experiences, it is helpful to efficiently transform the media content from one form to another so as to be compatible with other devices in the home media network. These transformations may include transcoding, transrating, and/or transsizing the media data.

Transcoding involves changing the data format of media to be compatible with another device within the network. For example, transcoding may involve the conversion of a video encoded in MPEG2 into WMV9 encoding.

Transrating involves changing the bit rate of the generated media stream. For example, a MPEG4-part 10 video may be transrated from 6 megabits per second for TV to a lower bit rate of 1.5 megabits per second for a portable media player.

Transsizing involves reformatting source media data for optimum display on a device with different a screen resolution or aspect ratio than the source media. For example, media data may be in a 16:9 High Definition TeleVision (HDTV)

format. To be optimally displayed on a 4:3 Quarter Common Intermediate Format (QCIF) mobile phone display, the media data must be transsized.

For a seamless user experience, these transformations should be performed in a timely fashion. Some challenges to performing timely transformations include: discovery and management of information about the capabilities of various devices within the home media network, communication of the location and the availability of source content; and the availability and performance of devices for transforming the media into the desired form.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

In the specification and appended claims, the term "served" refers to content that has been played back, i.e., displayed or otherwise presented by a device or content that is transferred between devices. For example, if an entertainment center has played an audio file, the entertainment center has "served" the audio file content. Similarly, if a High Definition Television (HDTV) connected to a set top box has displayed an audio/video presentation, the HDTV and/or the set top box "served" the content.

Additionally, as noted above, the term "served" is not restricted to content that is consumed by a user, but can describe content that is served by a first device to a second device for storage, transcoding, analysis, or display. The user may or may not actually consume the served content. For example, a home security camera may serve content to a home gateway for archiving. The user may not view the majority of the audio/video content produced by the home security camera and stored on the home gateway. Additionally, a first device may "serve" content by communicating content to a second device which forwards the content to a third device.

FIG. 1 is an illustrative diagram of a home media network formed among devices belonging to a given user and accessible through local and group associations. The home media network illustrated in FIG. 1 is comprised of a number of electronic devices that act as intelligent distributed agents. According to one embodiment, the network is comprised of: a home gateway (140), a mobile phone (110), a mobile computing device (115), a Bluetooth transponder (125), a Bluetooth enabled headset (120), and a security camera (105). These electronic devices are operated in the context of a single residence (130). According to one embodiment, the electronic devices communicate with each other to form a home media or peer-to-peer network. The electronic devices may communicate using a variety of methods including both wired and wireless protocols.

The home media network that results can share content and leverage other capabilities available through the various devices on the network. For example, the security camera (105) may record a video sequence of the perimeter of the house, which it sends to the home gateway (140) for archiving. The house owner is on vacation, but has the mobile phone (110). If the home owner desires to view the video sequence recorded by the security camera (105), the home owner can request the archive footage from the home gateway (140). This video sequence is then transcoded into a video format compatible with the mobile phone (110) and transmitted to the mobile phone (110) for viewing by the home owner.

During the vacation, the owner uses the mobile phone (110) to take pictures, record music, and make video sequences. When the owner returns home, the owner may want to share his vacation experience with a friend. The owner can use the mobile computing device (115) to request and display portions of the data stored on his mobile phone (110). If desired, portions of the data can be passed to the Bluetooth transponder (125) in the car. The Bluetooth transponder (125) may play audio portions of the data over the car's audio system and video portions over the car's built-in entertainment system. If desired, audio data can also be sent to the Bluetooth enabled headset (120).

The devices shown in FIG. 1 are merely representative elements in a home media network. A variety of other devices with varying levels of computational and communication capacity may be included in the network. By way of example and not limitation, television sets, desktop computers, laptop computers, personal digital assistants, mobile computing devices, printers, cameras, camcorders, gaming systems, and entertainment systems could all be included in the home media network.

Additionally, the home media network may be extended through a variety of local and neighbor group associations. For example, the devices associated with a neighboring residence (135) could be accessible, subject to desired privacy restrictions, through an extended home media network.

FIG. 2 is an illustrative chart showing various collaborative dialogue levels within a home media network. Among intelligent distributed agents within the home media network, several collaborative dialogue levels can occur. According to one embodiment, the collaborative dialogue may include requests for content, requests for transcoding a piece of content from a first data format into a second data format, discovering transcoding capabilities of various devices that make up the network, and updating shared content histories of various devices within the network. These collaborative exchanges allow for media content to be more effectively delivered through a variety of network elements and provide more flexibility for the owner to playback the content at a desired time, place, and format.

These dialogs may have varying levels of priority. When the owner requests content, the network and network elements assign a high priority to this task so that the content is delivered to the owner in a timely fashion. Similarly, when a request has been made for content that needs to be transcoded into a format compatible with the requesting device, the transcoding request take a high priority.

Other collaborative activities, such as discovering the transcoding capabilities of various devices on the network and updating shared content histories, may take lower priority and operate in the background. For example, these lower priority dialogues may be performed during a period when computational and network capacities are not being otherwise utilized.

The shared content history is a record of where content is located on the network and where and with what device content has been selected for playback by the user. Thus, the shared content history provides a method for communicating the availability and format of content distributed throughout the network.

In many cases, a display device receiving a request may not have the desired content stored locally. The display device may use a shared content history to ascertain which device within the network has the requested content and then download and display the requested content from the identified device. However, the content may not always be in a format compatible with the display device. Using knowledge of the transcoding capabilities of the network devices, the display device can request that another device transcode the requested content into the required format.

According to one illustrative embodiment, peer devices within the home media network contain a collaborative transcoding engine which supervises the dialogue layers, manages the information obtained through the dialogue, responds to content requests, and takes advantage of unused processor power/bandwidth to proactively transcode content. One or more of these collaborative dialogue layers can occur at any given time and may occur in any sequence. Additionally, the collaborative dialogue types shown in FIG. 2 are only illustrative examples of the types of communications which could be implemented in a collaborative transcoding environment.

Figure 3:
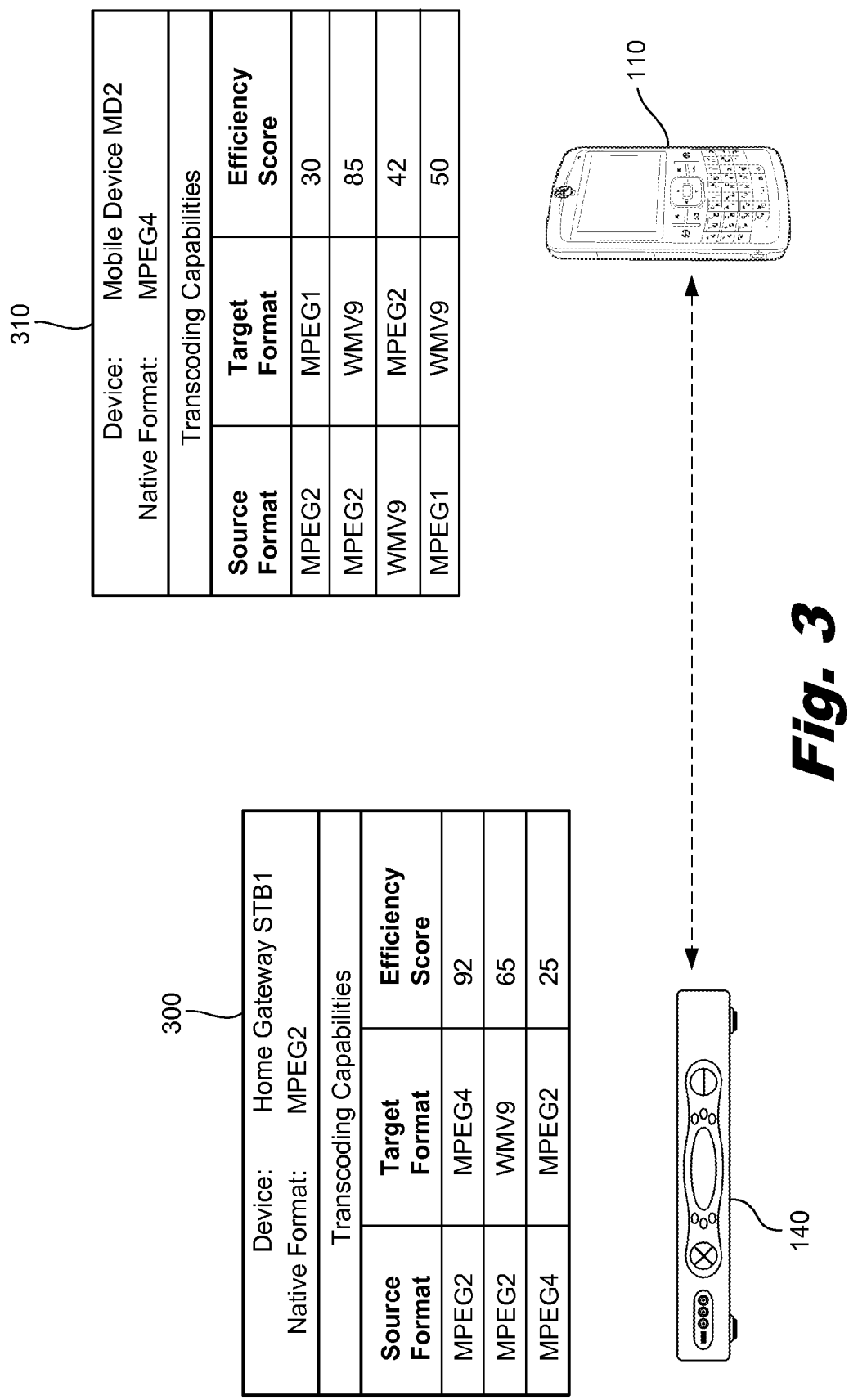
FIG. 3 is an illustrative diagram of peer devices discovering each other and sharing information about their respective native formats and transcoding capabilities, according to one embodiment of principles described herein.

According to one embodiment, when a new device is initially connected to the network, the new device may transmit information about its characteristics and capabilities to other network devices. FIG. 3 is an illustrative diagram of peer devices discovering each other and sharing information about their respective native formats and transcoding capabilities. In the illustrated example, a home gateway (140) is in communication with a mobile phone (110). The two devices exchange identifying information, such as a device name and the native format or formats of media content that can be played back by the device. The two devices also exchange information identifying the ability to transcode data from one format to another.

In the example illustrated in FIG. 3, a Set Top Box (STB) is used to implement home gateway functionality. In other cases, the STB and home gateway are separate devices. Particularly in Internet Protocol TeleVision (IPTV) deployments, where each television may have its own STB, having a single home gateway to provide interconnectivity within the home media network can lower the cost of the overall home media system.

In the example shown in FIG. 3, the home gateway (140) may transmit information that is listed in the illustration within a first box (300). The information identifies the home gateway (140) as "Home Gateway STB1" and having a native format of "MPEG2." The home gateway (140) then identifies its capabilities to transform various data formats by identifying a source format, a target format, and an efficiency score. The source format is the original format of the data and the target format is the new format after transcoding. For example, the home gateway (140) reports that it can transcode MPEG2 audio/video data into an MPEG4 data format with an efficiency score of 92. The efficiency score is used to compare various devices on the network which are capable of performing the same transcoding operation and to select the device which is more efficient in making the conversion.

According to one illustrative embodiment, the efficiency score may be a combination of a variety of characteristics of a device, including, but not limited to, computational power and encoding capability. The efficiency score may be a static number or may reflect the dynamic condition of the device. For example, a static number could be assigned to a device based on the central processing unit (CPU), amount of random access memory (RAM), software used in the transcoding, hardware acceleration, etc. Additionally or alternatively, the efficiency score may be dynamically calculated to account for various conditions within the device and the network. For example, if a home gateway (140) is currently downloading and recording two programs, it may not have a large amount of excess CPU or RAM capacity to use in the transcoding process. The dynamic efficiency score of the home gateway would be lower due to lack of available capacity. The transcoding could then be performed on another device with a higher dynamic efficiency score and more available capacity. By dynamically changing the transcoding score depending on what other functions are taking place within the network and various networked devices, the workload can be more efficiently balanced and executed.

The efficiency score is only one example of a transcoding score that could be used to discriminate between two or more devices that can each be selected to perform a desired transcoding. By way of example and not limitation, a quality score could be used. The quality score may measure the quality of the transcoding in a number of ways. For example, the quality may be measured by quantifying the number of dropped frames in a video sequence; the peak signal-to-noise ratio; the number of artifacts; calculating the total amount of compression; considering the algorithm/hardware used to perform the calculation, or considering a variety of other factors.

In the first table (300) shown in FIG. 3, the home gateway (140) has an efficiency score of 92 for transcoding of MPEG2 data into MPEG4 data, but only an efficiency of 25 for transcoding from MPEG4 data into MPEG2 data. This discrepancy in efficiency scores may result from a variety of factors. For example, the home gateway (140) may use dedicated hardware to perform the MPEG2 to MPEG4 transcoding while the MPEG4 to MPEG2 transcoding may be performed solely in software. A variety of other factors may contribute to differences in efficiency scores including the transcoding and encoding algorithms.

The mobile device (110) may similarly transmit its identifying information and communicate its native format. According to one illustrative embodiment, the mobile device (110) may use a Windows Mobile® operating system and support a variety of data transcoding including conversion of MPEG2 data into Windows Media version 9 (WMV9) data format. In this case, the mobile device (110) has its highest efficiency in this transcoding, possibly because the operation system is optimized for this conversion.

Figure 4:
FIG. 4 is an illustrative diagram of a shared content history showing what content various devices have transcoded and what content has been served, according to one embodiment of principles described herein.

FIG. 4 is an illustrative diagram of a shared content history (400) showing the various content items that devices within the home media network rendered and/or served. To create a shared content history (400), devices dialog about what content they have served or transcoded.

According to one embodiment, the shared content history (400) includes the content that various devices within the network have transcoded. For example, a set top box "STB1" has transcoded content identified as "World Series 2009 Highlights" into an MPEG4 format. Additional information, such as a time stamp, can also be provided to uniquely identify the content.

Various instances of content served by devices within the network can also be included in the shared content history. For example, following the transcoding by the set top box "STB1" of "World Series 2009 Highlights" the content was served by the set top box later the same day as shown by the associated time stamp "11/20/09 23:45:45."

Other entries in the shared content history (400) show that a camera "C7" transcoded content identified as "Home Cam 12/06/09 15:15:00" into a Windows Media v. 9 (WMV9) at a time of 12/06/09 15:16:09. This content was later served by mobile device "MD10" in the WMV9 format. A few minutes later, the camera served the same content in MPEG2 format.

According to one illustrative embodiment, a shared content history (400) is maintained separately by each of the devices and may not be identical to the shared content history of another device. The shared content history (400) can serve as an index from which the storage location and format of content can be ascertained by a device which has received a content request. Additionally, the shared content history (400) can be analyzed to acquire knowledge of supply and demand for content in various formats.

Figure 5:
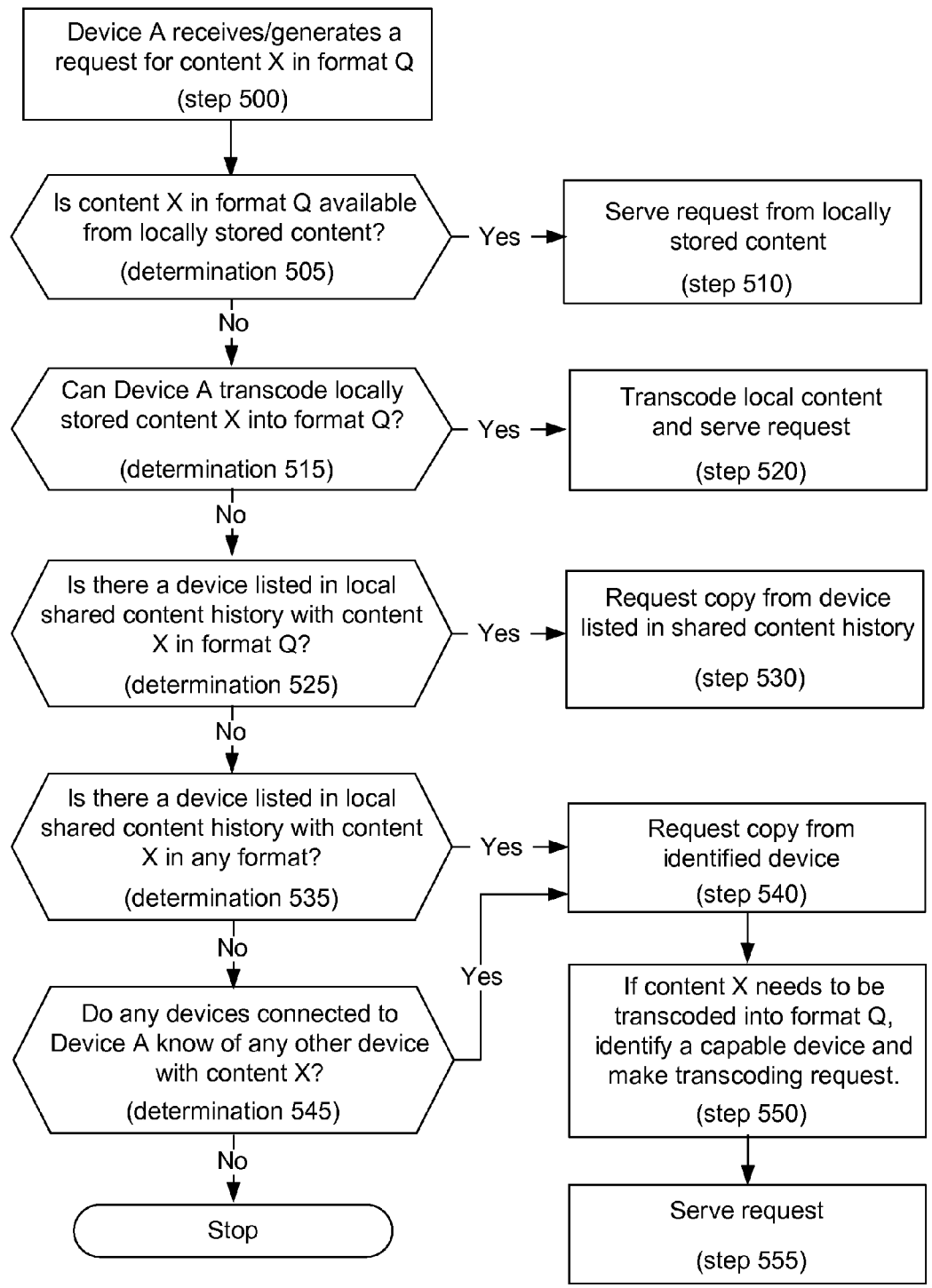
FIG. 5 is an illustrative flowchart of a method for fulfilling a content request, according to one embodiment of principles described herein.

FIG. 5 is an illustrative flowchart of a method for fulfilling a content request. In a first step, device A receives or generates a request for content X in format Q (step 500). Device A then determines if content X in format Q is available from locally stored content (determination 505). If content X in format Q is locally available, the request is served by Device A from the locally stored data (step 510).

If content X in format Q is not available locally, Device A determines if it can transcode locally stored content X into format Q (determination 515). If Device A has the content in another format stored locally and the required transcoding capability it transcodes the locally stored content X into format Q and serves the request (step 520).

If Device A cannot make the desired transcoding or does not have content X stored locally, Device A determines if there is a device listed in the local shared content history with content X in format Q (determination 525). If there is, Device A requests a copy of content X in format Q from that device (step 530).

If there is not, Device A then searches the shared content list for content X in any format (determination 535). If content X is discovered in an alternative format, Device A then requests a copy from the identified device (step 540). Device A then searches the known transcoding capabilities of devices within the network to identify the most capable/efficient device to transcode content X into format Q (step 550). Device A then makes a request for the transcoding and serves the original request for content X in format Q (step 555).

If the content cannot be obtained from any device within the home network, Device A determines if there are any devices within the home network that know of any other device with content X (determination 545). If a device is identified, Device A requests a copy of content X from the identified device (step 540). If the received content X is in format Q, Device A servers the request. If the received content X is in another format, Device A identifies a transcoding device, makes a request to the transcoding device for transcoding of the content into format Q (step 550), and serves the request (step 555).

In the event that Device A cannot find the desired content locally, on a device within the home network, or on a device outside of the home network, the process ends.

The steps described above are only one illustrative example of a process that could be performed to fulfill requests within a network. A variety of other modifications could be implemented. By way of example and not limitation, searches for content X could be modified to include content that does not exactly match the content X criteria. This "fuzzy" search could be valuable in identifying content that substantially fulfills the desires of the user but is not an exact match to the search criteria. For example, if requested content specifies a DVR (Digital Video Recording) recording of a particular show which starts at 7 pm, a DVR recording which starts at 7:01 pm of the same show may substantially fulfill the user's expectations.

Figure 6:
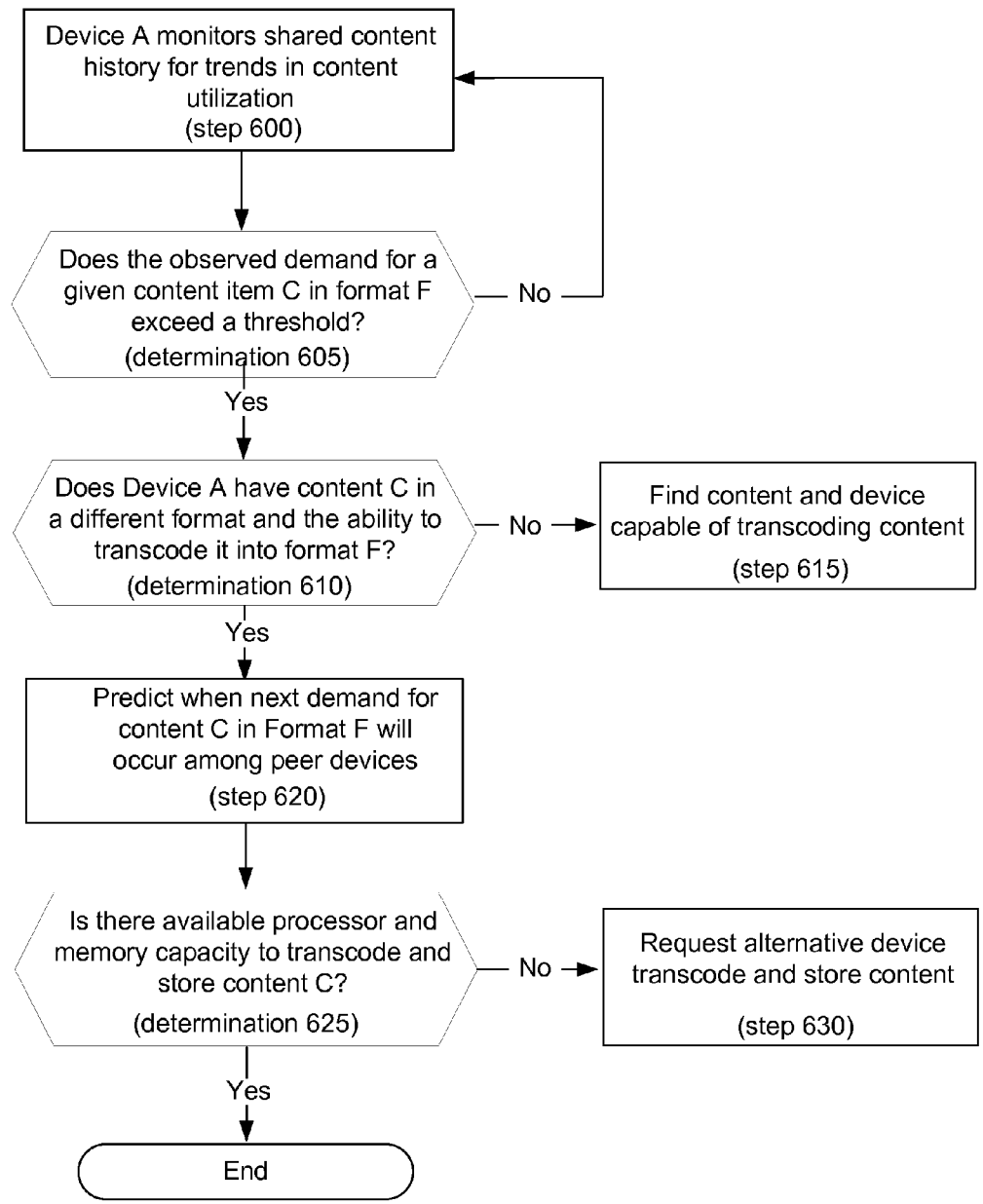
FIG. 6 is an illustrative flowchart of a method for proactive content transcoding and storage, according to one embodiment of principles described herein.

FIG. 6 is an illustrative flowchart of a method for proactive content transcoding and storage. Proactive content transcoding and storage is a method for anticipating a future request and preparing the content in advance. For example, a user may work every night until 10 pm. When the user arrives home, the user requests that the kitchen laptop display the nightly program of a popular television series which was broadcast at 8 pm. Without proactive transcoding and storage the user must wait while the laptop queries devices within the home network to determine the location of the content, transcode the content into a format compatible with the laptop, and transfer the content to the laptop. However, if a proactive transcoding and storage method is in place, one or more devices within the home network may have anticipated the request and taken steps to fulfill the request before the request is actually made.

In a first step, Device A monitors the shared content history for trends in content utilization (step 600). According to one illustrative embodiment, the monitored trends may include a pattern of requests for particular content and/or playback of content at a particular time or in a particular location.

For content that Device A does not have locally in the desired format, Device A determines if the observed demand (as captured by the shared content history) for a given content item C in format F exceeds a threshold (determination 605). This threshold may be any combination of a number of factors. By way of example and not limitation, this threshold could be the number of times a request has been made for particular type or class of content to be transcoded or played back. The threshold or other prediction of future demand may be calculated using a variety of probabilistic models.

If the demand does not exceed the threshold, Device A continues monitoring the shared content history. If the demand does exceed the threshold, Device A determines if it has the desired content C in a different format which Device A can transcode into format F (step 610). If Device A does not, Device A locates the content and finds a device capable of transcoding the content into format F (step 615). By way of example and not limitation, this step can be performed by following steps similar to those described with respect to FIG. 5.

If Device A has content C, but in an alternative format, Device A predicts when the next demand for the content C in format F will occur among peer devices (step 620). Device A then balances its current priorities and resources to determine if it would be advantageous for it to transcode the content (determination 625). If it would be advantageous, Device A transcodes the content C into format F and stores the content. If Device A determines that it has higher priorities, it can request that an alternative device transcode and store the content (step 630). For example, if Device A is a set top box, it may be recording a show when it determines that a future demand for content C in format F is likely to occur. Device A would then make an evaluation of its current excess capabilities to see if it would be more effective for Device A to transcode and store the content or if it should request assistance from an alternative device.

As mentioned above, a collaborative transcoding engine could be used to implement the transcoding methodology described above. In some embodiments, the collaborative transcoding engine could be resident on one or more of the devices within the home media network. Less capable devices, such as devices intended primarily for presentation of content may not have the capability to efficiently host the collaborative transcoding engine. However, the users of an overall home media network could still gain significant benefits from the operation of the more capable devices which collaborate via the collaborative transcoding engine.

In sum, the home media network collaboration described above increases the availability of content in the desired formats while efficiently utilizing the device and network resources in a home media network. The proactive sharing of information between devices allows for superior content location and access to efficient transcoding capabilities. Future requests can be anticipated using probabilistic models of when demand is likely to occur.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of collaborative transcoding comprising:
   in a first peer device, discovering transcoding capabilities of a plurality of peer devices within a network, wherein the network is a peer-to-peer network interconnecting the plurality of peer devices and the first peer device within said network;
   in the first peer device, exchanging information with other peer devices of the plurality of peer devices, the information identifying content stored within said network in the other peer devices;
   in the first peer device, storing information about the transcoding abilities and the information about content;
   in the first peer device, anticipating a request by a user of the first peer device for a content item in a target format;
   in the first peer device, identifying a location of said content item within said network by referencing said stored information about content;
   if said location is not in the first peer device, obtaining said content item from the location and storing said content item in the first peer device;
   if said content item is not in said target format:
      in the first peer device, selecting, based on the stored information about transcoding abilities, a second peer device within said network to receive said content item and transcode said content item into said target format;
      receiving, in the first peer device, said content item from the location;
      sending said content item from the first peer device to the second peer device;
      receiving, in the first peer device, a transcoded copy of the content item from the second peer device in said target format.

2. The method of claim 1, wherein said discovering transcoding capabilities of said plurality of peer devices within the network comprises communication of native format and transcoding capabilities for each of said plurality of peer devices.

3. The method of claim 2, further comprising discriminating between said plurality of devices configured to transcode from a first format to a second format based on a transcoding score assigned to each of said plurality of peer devices.

4. The method of claim 3, further comprising, in said first peer device, using said transcoding score to select a peer device within said network to transcode said content item from a source format to said target format.

5. The method of claim 3, wherein said transcoding score comprises at least one of: an efficiency score and a quality score.

6. The method of claim 3, further comprising dynamically altering said efficiency score according to a current capacity of said peer device to transcode content from said first format to said second format.

7. The method of claim 1, further comprising generating a shared content history at said first peer device, by exchanging information among said first peer device and said plurality of peer devices within said network.

8. The method of claim 7, further comprising generating said shared content history by exchanging information identifying content transcoded and content served in said plurality of peer devices.

9. The method of claim 1, further comprising receiving, at the first peer device, said anticipated request and playing back said content item in response to said request.

10. The method of claim 1, wherein said anticipating a request comprises:
    monitoring a shared content history to determine a trend of content usage; and
    comparing said trend of content usage to a threshold.

11. The method of claim 10, further comprising:
    predicting when a future demand for content among said plurality of peer devices will occur; and
    evaluating available processor and memory capacity to determine if excess capacity exists to prepare for said future demand.

12. The method of claim 1, wherein identifying said location of said content item comprises searching a shared content history to identify said location of said content item.

13. The method of claim 1, further comprising:
    in the first peer device, determining whether said first peer device can deliver said content item in said target format without assistance from said other peer devices within said network; and
    responsively to said determining, if said first peer device cannot deliver said content item in said target format without assistance from said other peer devices, then searching a shared content history stored in the first peer device to find said second peer device to assist said first peer device in delivering said content item.

14. The method of claim 13, wherein said second peer device assists said first peer device by at least one of: providing said first peer device with said content item and transcoding said content item.

15. The method of claim 13, further comprising querying said other peer devices within said network to determine if said other peer devices are aware of any outside peer devices that can provide said content item.

16. A system for collaborative transcoding comprising:
    a first networked peer device configured to be communicatively coupled to a network, said network interconnecting said first peer device with a plurality of networked peer devices, wherein said plurality of networked peer devices comprises the first networked peer device and at least one other networked peer device, said first networked peer device receiving a request for a content item in a target format, wherein the network is a peer-to-peer network;
    a shared content history stored within said first networked peer device; said shared content history comprising a list of content available on said plurality of networked peer devices within said network, said first networked peer device searching said shared content history to determine if another networked peer device can provide said content item;
    a capability list comprising a native format and transcoding capabilities of said plurality of networked peer devices, said first networked peer device searching said capability list to determine if any said networked peer device is configured to transcode said content item from a source format to a target format.

17. The system of claim 16, wherein said capability list is created prior to said request for content.

18. The system of claim 16, wherein said shared content history is updated through a background dialogue between said first networked peer device and a second networked peer device.

19. The system of claim 16, said capability list comprising an efficiency score rating a transcoding capability of a said networked device.

20. A computer program product for collaborative transcoding, the computer program product comprising:
- a non-transitory computer usable medium having computer usable program code embodied therewith, the computer usable program code comprising:
- computer usable program code configured to create an ongoing layered dialogue between devices in a peer-to-peer networked environment, wherein the devices are peer devices within the peer-to-peer networked environment, said ongoing layered dialogue comprising communication of content transcoded, content served, transcoding capabilities, transcoding scores, requests for transcoding, and requests for content, wherein transcoding score comprises an efficiency score and a quality score;
- computer usable program code configured to configured to search information communicated in said ongoing layered dialogue to discover at least one of: a location where a requested content item is stored, said devices configured to transcode a said requested content item, and a said device with a highest transcoding score for a desired transcoding operation; and
- computer usable program code configured to make a request for said device with a highest transcoding score to make said desired transcoding operation.

* * * * *